United States Patent Office 2,871,243
Patented Jan. 27, 1959

2,871,243

5-AMINO-3-METHYL-ISOTHIAZOLE AND PROCESS

Arthur Adams, Essex, and Ronald Slack, London, England, assignors to May & Baker Limited, Dagenham, England, a British company No Drawing. Application October 21, 1957
Serial No. 691,162

Claims priority, application Great Britain
October 26, 1956

2 Claims. (Cl. 260—306.8)

This invention relates to heterocyclic compounds and more particularly to new and useful isothiazole compounds.

According to a feature of the present invention there are provided new isothiazole compounds of the formula:

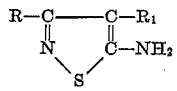

wherein R represents a lower alkyl group, for example, a methyl group, or an aryl or aralkyl group and $R_1$ represents a hydrogen atom or a lower alkyl, aryl or aralkyl group. By the term "lower alkyl" is meant an alkyl group containing not more than four carbon atoms.

According to a further feature of the invention the said compounds of the foregoing formula are prepared by the ring-closure of corresponding β-iminothioamides of the formula:

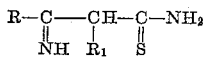

wherein R and $R_1$ are as hereinbefore defined. These thioamides exhibit tautomerism and the tautomeric forms and the course of the reaction may be shown as follows:

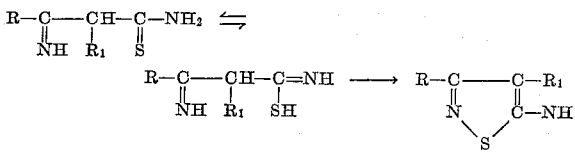

The ring-closure may be effected by treating the said β-iminothioamides with an oxidising agent such as hydrogen peroxide, chloramine, chloramine T or a persalt such as potassium or ammonium persulphate.

The new amino-isothiazoles may be subjected to a number of known reactions to give products such as carboxylic or sulphonic acid amides by, for example, conversion of the 5-amino group by known methods of acylation to give products which are of therapeutic interest. More particularly, the compound in which R represents a methyl group and $R_1$ represents a hydrogen atom is convertible in known manner into 5-p-aminobenzenesulphonamido-3-methyl isothiazole, a compound which shows antibacterial activity as great as, or greater than, that of sulphathiazole, more specifically against E. coli.

The invention is illustrated by the following examples.

Example I

An ice-cooled solution of sodium hydroxide (9.2 g.) in water (44 cc.) and ice (51 g.) was treated with chlorine until the increase in weight was 7.15 g. This solution was stirred into an ice-cooled solution of aqueous ammonia (10.6 cc.; d 0.88), in water (147 cc.) and ice (147 g.). To the solution of chloramine so formed was added powdered β-iminothio-n-butyramide (11.6 g.) and the mixture was shaken for two hours and set aside overnight. The filtered solution was extracted with ether, and the dried extracts were treated with dry hydrogen chloride. The precipitated hydrochloride (11.0 g.) was dissolved in water, the solution made alkaline with sodium hydroxide, and extracted with ether. Evaporation of the dried extracts left 5-amino-3-methylisothiazole (6.8 g.) as a yellow oil which crystallised on standing. The hydrochloride, purified from ethanol and ether, formed white needles, decomposing ca. 240° C.

Example II

β-Iminothiobutyramide (2.3 g.) was shaken for four hours with a solution of chloramine T trihydrate (5.6 g.) and sodium hydroxide (0.8 g.) in water (100 cc.). The clear solution was extracted with ether, and the dried extracts were treated with dry hydrogen chloride. Crude 5-amino-3-methylisothiazole hydrochloride (2.4 g.) was precipitated as a yellow solid, which was converted into the base and characterised as the benzoyl derivative, M. P. 222–223° C.

Example III

A solution of sodium hydroxide (136 g.) in water (7 l.) was stirred mechanically and cooled to 12° C. by the addition of ice (ca. 500 g.). Powdered potassium persulphate (460 g.) was added and the suspension stirred for 10 minutes. Powdered β-iminothiobutyramide (197 g.) was added in portions during 20 minutes, together with sufficient ice to keep the temperature of the mixture between 12° and 18° C. (ca. 2 kg.). A clear red solution was obtained after about 30 minutes. The solution was stirred for a further 6 hours and allowed to stand overnight. A small amount of inpurity was then filtered off and the solution extracted continuously with ether (1 l.) for 24 hours. The extract was dried ($Na_2SO_4$), cooled in ice and treated with dry hydrogen chloride gas. The precipitated amine hydrochloride was collected immediately, washed with dry ether and dried in a desiccator. The amine hydrochloride (1 part) was dissolved in water (10 parts) and the solution filtered. 50% (w./v.) sodium hydroxide solution (1 vol.) was added and the solution continuously extracted with ether overnight. The extract was dried ($Na_2SO_4$) and evaporated and the residue distilled in vacuo to give 5-amino-3-methyl-isothiazole as a pale yellow solid, M. P. 52–53° C., B. P. 90–92° C./0.1 mm.

Example IV

To an ice-cooled solution of hydrogen peroxide (30% w./v.; 7 cc.; 0.06 mol.) in 2 N hydrochloric acid (10 cc.; 0.02 mol.) was slowly added, with stirring, powdered β-iminothiobutyramide (2.32 g.; 0.02 mol.). During the addition, the temperature was not allowed to rise above 40° C. The solution was filtered, the filtrate was made alkaline with sodium hydroxide, and extracted with ether. The ether extracts were washed with ferrous sulphate solution, dried over magnesium sulphate, and saturated with dry hydrogen chloride. The precipitated 5-amino-3-methylisothiazole hydrochloride (0.44 g.; M. Pt. > 200° C.) was dissolved in water (20 cc.), and the filtered solution was made alkaline with 50% aqueous sodium hydroxide, and extracted with ether (7 x 25 cc.). The combined extracts were dried over magnesium sulphate, and evaporated, giving 5-amino-3-methylisothiazole (0.35 g.) as an oil.

We claim:
1. 5-amino-3-methylisothiazole.
2. A process for the production of 5-amino-3-methyl-isothiazole which comprises reacting β-iminothiobutyramide with an oxidising agent selected from the group consisting of chloramine, potassium persulphate and hydrogen peroxide.

No references cited.